E. C. TAYLOR.
METHOD OF TREATING RUBBER ARTICLES.
APPLICATION FILED OCT. 7, 1920.
1,422,147.
Patented July 11, 1922.
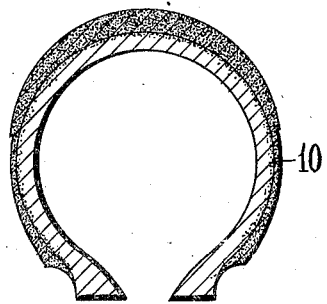
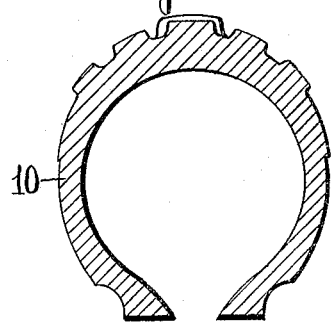
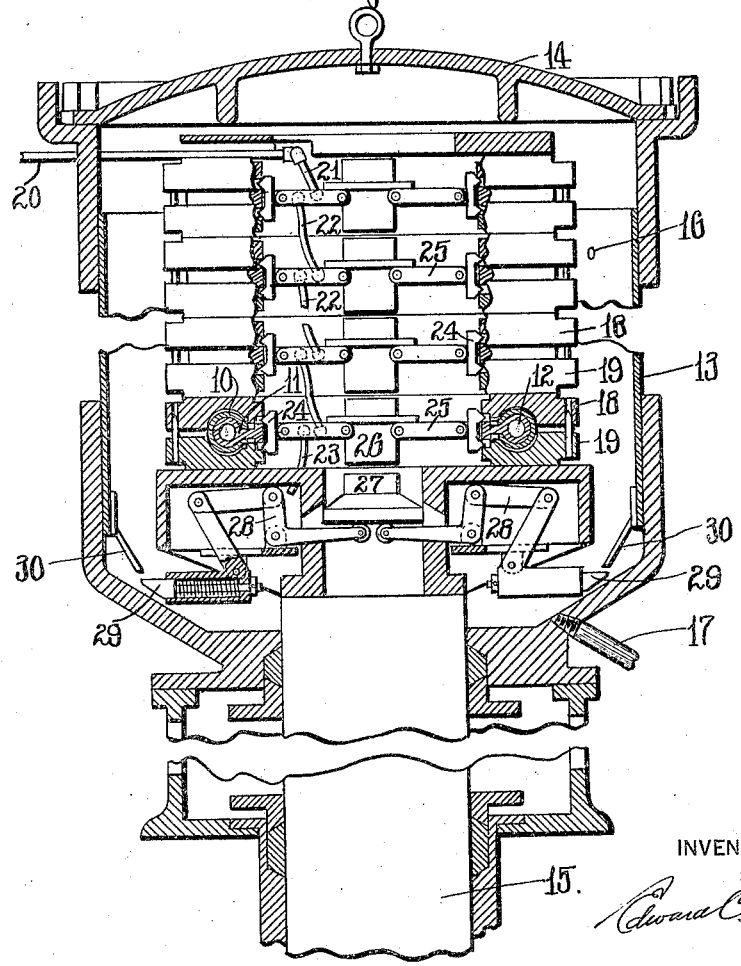
INVENTOR
Edward C Taylor

UNITED STATES PATENT OFFICE.

EDWARD C. TAYLOR, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF TREATING RUBBER ARTICLES.

1,422,147.         Specification of Letters Patent.     Patented July 11, 1922.

Application filed October 7, 1920. Serial No. 415,366.

*To all whom it may concern:*

Be it known that I, EDWARD C. TAYLOR, a citizen of the United States of America, residing at Springfield, in the county of Hampden and State of Massachusetts, have invented certain new and useful Improvements in the Methods of Treating Rubber Articles, of which the following is a specification.

My invention relates to methods of treating rubber articles prior to and during the vulcanizing operation and is particularly directed to the manufacture of tire casings.

The objects of my invention will appear from the following description and claims.

In curing tire casings, especially those of the cord type, it has been considered that to obtain tires without buckles or wrinkles it was necessary to follow either one of two courses. One standard method has been to cure the casing in a single operation while confined between an interior expansive member and an exterior rigid mold. The exspansive member, usually termed a water or air bag, deteriorated rapidly in use and added materially to the cost of tires cured by this method. The other standard method, known as the two cure method, consisted in partially vulcanizing the carcass alone between rigid molds, applying a raw or partially vulcanized tread, and curing the assembled casing. This method necessitated many extra operations, such as curing, buffing, cementing and handling the several parts of the casing; and gave a cemented joint between the carcass and tread which was inherently less perfect than the vulcanized joint obtained in a single cure tire.

The reason for the use of the two processes described above, in spite of their disadvantages, lies mainly in the action of the rubber during the application of pressure prior to vulcanization. In order that molding action will occur over the entire surface of a tire cured between a mold and a core it is necessary that the size of the unmolded casing should be slightly larger than the interior of the mold. This means that as the mold sections close some of the rubber will be carried towards the junction of the mold sections and forced out as a "flash" or a "fin." Another cause of the flowing of the rubber is in the molding of a non-skid tread, where the rubber is forced to shift from its original flat surface to take the irregular form of the impressed pattern. From whatever cause this shifting of the tread rubber during the application of pressure arises, it tends to cause the fabric or cords forming the carcass of the tire to flow with it because of the highly viscous nature of the rubber. This shifting of the fabric as it is drawn out of place by the flowing rubber, causes wrinkles and buckles in the strain-resisting elements of the carcass which greatly impair the efficiency and life of the tire. The flowing of the rubber which causes this trouble occurs only during the short time when pressure is being applied, as when the mold sections are fully closed there can be no further appreciable movement.

The injurious movement of the carcass above described can be minimized by increasing the difference in the resistances to flow of the carcass and the tread in such a manner that the tread is enabled to conform to an impressed pattern without displacing the carcass. My invention is directed to one manner of accomplishing this result.

According to my invention I subject the carcass and tread of an assembled casing to different temperatures so that the tread is rendered by the heat temporarily softer than the carcass, or, the carcass stiffened with respect to the tread by the cooling. In the preferred form of the invention this is accomplished by applying heat to the outside of the assembled casing while the inside is maintained at a lower temperature, as by circulation of a cooling medium through a core upon which the tire is mounted. The temperature of the inside of the casing may be maintained at substantially the temperature of the atmosphere, of may be above that of the atmosphere so long as it is lower than the temperature of the outside of the casing, but it is preferably kept lower than atmospheric temperature so that the viscosity of the rubber in the carcass will be reduced below the normal and further resistance to the shifting of the carcass material will be offered.

After the difference between the resistances to flow of the carcass and tread has been augmented as above described sufficiently so that the tread rubber may be caused to flow without displacing the carcass the mold sections may be safely closed and the desired molding pressure applied. The tire is now ready for vulcanization, which may be carried out in any desired way, usually by filling with steam the chamber in which the molds are placed. In cases where a cooling medium has been circulated through the core on which the casing is mounted it may be found desirable to replace the cooling medium with a heating medium to bring the tire to an even temperature, and the heat supplied to the core in this instance may be maintained during vulcanization or discontinued as desired.

In order to disclose more particularly one manner in which my invention may be practiced I will now refer to the accompanying drawings, in which—
Fig. 1 is a section of a tire casing, showing by stippling the warmer area;

Fig. 2 is a similar view showing the completely cured casing; and

Fig. 3 is a cross-sectional elevation, partly broken away, of a vulcanizing chamber with associated parts showing an arrangement whereby the inside of the casings may be maintained at a lower temperature than the outside.

A tire casing 10 in its unvulcanized state is, in this manner of practicing my invention, mounted on a core 11 arranged to permit of its being maintained at a lower temperature than that of its surroundings. As shown, the core is hollow, affording a space 12 for the circulation of a cooling medium. The heater may be generally of the usual construction, having a body portion 13 provided with a removable cover 14 and a hydraulic ram 15 serving to press articles mounted thereon against the cover. Provision is made, as by an inlet 16 and an outlet 17, for circulating a heating medium through the interior of the heater around the articles mounted on the ram. I have shown the molds used for forming the tire casings during vulcanization as being of the usual type, having two mating sections 18 and 19 which form between them a molding recess of the shape of the tire. In order to circulate a cooling medium through the hollow cores on which the casings are mounted I have shown a pipe 20 connected by a flexible pipe 21 with the uppermost core, flexible pipes 22 joining adjacent cores, and a pipe 23 joining the lowermost core to the outlet. The hollow interior of the core may be joined to the piping described by suitable connections not necessary to illustrate.

Toggle operated double wedges 24 are provided which serve to hold the mold sections apart and to hold the core and the tire mounted thereon in a central position with respect to the mold sections, as is clearly shown in the lowermost mold in Fig. 3. The inner ends of the toggles 25 are pivoted to heads 26 having flanges arranged to hold the toggles in operative position, the line of the pivots on heads 26 being in this position slightly lower than the outer ends of the toggle arms. A head 27, controlled by lever systems 28 from pawls 29 serves to raise the lowermost head 26 when by the elevation of ram 15 pawls 29 are tripped by lugs 30 secured to the heater.

In practicing my invention with the above device the tire casings, supported on the hollow cores, are arranged within the mold sections with wedges 24 in position and the piping connected. The cover 14 is applied, a cooling medium, such as water, circulated through the cores, and a heating medium, such as steam, admitted to the interior of the heater. After the tread has become softened relative to the carcass the supply of the cooling medium is discontinued, and, if desired, replaced by a heating medium, and the ram 15 elevated. This first trips the pawl and lever mechanism described above and then applies pressure to the molds by pressing them against the cover of the heater. The tread being softened by heat (illustrated by the stippling in Fig. 1) while the carcass remains in its normal condition or is stiffened by being cooled, the molding of the tread into the desired form as indicated by 31, Fig. 2, is accomplished without injury to the carcass.

It is not necessary in carrying out my invention to use the apparatus just described. For example the cores may be chilled, leaving the tread portion at substantially atmospheric temperature, and the cores and casings then placed in molds and pressure applied in the usual way but before the temperature of the casing has had time to equalize. Or the core may be cooled and the tread warmed before placing the casing in the mold in the usual way. Or a short heat may be given the tread while relying on the high specific heat of the core to keep the carcass temperature lower than the tread, care being taken not to continue the heating to a point where the carcass commences to soften. Or the casings may be assembled in molds in a heater in the usual manner but without applying pressure to the casings until the difference in the resistances to flow has been increased by cooling the core or heating the tread. In the latter case the weight of the molds alone will not be sufficient to cause shifting of the carcass unless too many are piled upon each other. In all these cases it is desirable in practicing my invention to discontinue the preliminary heating, if given, before substantial vulcanization takes place, as after this point is reached the heat serves to stiffen the rubber instead of softening it. In short, I realize that my invention may be practiced in numerous ways, some of which I have pointed out, and do not wish it to be limited in scope except as defined in the appended claims.

I claim:

1. The method of vulcanizing an assembled tire casing comprising locating the casing on a hollow core, directing a cooling medium into the interior of the core, subjecting the exterior of the casing to heat, and subsequently applying molding pressure and vulcanizing heat to the casing.

2. In the vucanization of tire casings, assembling the carcass and tread portions upon a hollow core, introducing a cooling medium into the core, subjecting the exterior of the casing to heat to warm and soften the tread relative to the carcass, holding the casing under molding pressure while the tread is warmer than the carcass, and subsequently vulcanizing the casing.

3. In the vulcanization of tire casings, assembling the carcass and tread portions upon a hollow core, introducing a cooling medium into the core, subjecting the outside of the casing to heat to warm and soften the tread relative to the carcass, holding the casing under molding pressure between the core and an outer rigid mold while the tread is warmer and softer than the carcass, and subsequently vulcanizing the casing by heating both carcass and tread while the casing is compacted between the core and an outer rigid mold.

EDWARD C. TAYLOR.